United States Patent
Abriss et al.

[15] 3,687,885
[45] Aug. 29, 1972

[54] WATER BASE PAINTS HAVING AN IMPROVED BALANCE OF ANTI-DRIP AND LEVELING QUALITIES

[72] Inventors: Murray S. Abriss, Havertown; Maurice J. McDowell, Media, both of Pa.

[73] Assignee: E. I. duPont de Nemours and Company, Wilmington, Del.

[22] Filed: April 15, 1970

[21] Appl. No.: 28,925

[52] U.S. Cl........260/29.6 WB, 117/161 UZ, 117/161 UD, 260/17 R, 260/29.6 RW, 260/29.6 NR, 260/29.6 TA, 260/29.7 W, 260/29.7 NR
[51] Int. Cl................................................C08f 37/18
[58] Field of Search..........260/29.6 WB, 29.6 RW, 29.7 W, 260/29.6 ME

[56] References Cited

UNITED STATES PATENTS

| | | |
|---|---|---|
| 2,795,564 | 6/1957 | Conn et al..............260/29.6 |
| 3,026,281 | 3/1962 | Harren et al..............260/29.6 |
| 3,170,888 | 2/1965 | Kutik et al...............260/29.6 |
| 3,244,655 | 4/1966 | Sullivan et al............260/29.6 |
| 3,301,829 | 1/1967 | Woodward et al. ......260/78.5 |
| 3,306,863 | 2/1967 | Leitner..........................260/8 |
| 3,489,728 | 1/1970 | Bailey et al..................260/79 |

Primary Examiner—William H. Short
Assistant Examiner—E. Nielsen
Attorney—David J. Gould

[57] ABSTRACT

A coating composition comprising:
 [A] an aqueous dispersion of a polymer of ethylenically unsaturated monomers;
 [B] finely divided hydrous silicate;
 [C] non-ionic surfactant; and
 [D] non-cellulosic thickener.

18 Claims, No Drawings

WATER BASE PAINTS HAVING AN IMPROVED BALANCE OF ANTI-DRIP AND LEVELING QUALITIES

BACKGROUND OF THE INVENTION

This invention relates to aqueous paints. It is more particularly directed to such paints based on aqueous dispersions of water-insoluble copolymers of ethylenically unsaturated monomers.

In recent years, latex paints, i.e. paints based on aqueous dispersions of synthetic organic polymers, have come into widespread use because they can be easily applied, easily cleaned from brushes and rollers, and because they are generally free of objectionable odor.

It has long been thought desirable to develop a latex paint that does not tend to drip or splatter. One approach to this problem has been to admix with the coating composition a suitable amount of additives which will render the coating composition less susceptible to drip or splatter. But unfortunately, when this is done, the resulting coating composition has less than entirely satisfactory leveling properties (i.e. will show objectional brush and roller marks) and has a tendency to produce a dry film that has more texture than is desired for some applications.

SUMMARY OF THE INVENTION

According to the present invention there is provided:
A coating composition comprising

[A] an aqueous dispersion of at least one particulate water insoluble copolymer of ethylenically unsaturated monomers of 2–20 carbon atoms, said copolymer containing about 0.5–10 percent (by weight) of ethylenically unsaturated acid monomer units and having a number average molecular weight of at least 50,000, the copolymer particles having diameters within the range of 0.05–3 microns;

[B] about 0.5 to about 2 percent by weight, based on the entire weight of the composition, of finely divided hydrous silicate;

[C] about 15 to about 200 percent by weight, based on the weight of the hydrous silicate, of non-ionic surfactant selected from the group consisting of polyoxyalkylated $C_1$ through $C_{12}$ alkylphenols and polyoxyalkylated $C_8$ through $C_{22}$ alcohols;

[D] about 0.1 to about 1.5 percent by weight, based on the entire weight of the composition, of a non-cellulosic thickener prepared by admixing 1. 1–50 parts (by weight) of a copolymer of
a.

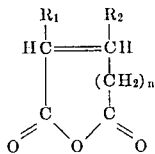

where $R_1$ and $R_2$ are hydrogen, halogen, —CN, alkyl radicals of one through six carbon atoms, phenyl, benzyl or cycloaliphatic radicals of three through six carbon atoms;
and
$n$ is 0, 1, 2 or 3,
or
itaconic anhydride;
and b. an alkene of two through nine carbon atoms, vinyl acetate, vinyl chloride, methyl vinyl ether, ethyl vinyl ether, indene, cinnamic acid ethyl ester, acenaphthene, acrylonitrile, or an ester of acrylic or methacrylic acid with an alkanol of 1–18 carbon atoms; the (a) to (b) ratio being 0.05–1/1–1.5, the copolymer having a weight average molecular weight of 20,000 to 1,500,000,
with 2. 1 part (by weight) of a compound of the formula
$M\zeta[(CH_2)_n\zeta]_mD$
where
M is alkyl of one through 18 carbon atoms or aryl of six through 20 carbon atoms;
$\zeta$ is —NH—, oxygen or sulfur;
D is hydrogen, alkyl of 1 through 18 carbon atoms or aryl of 6 through 20 carbon atoms;
$n$ is 1–5; and
$m$ is 1–100, said composition having a pH of about 9–10.5.

It has been found that the coating compositions of this invention do not tend to drip or splatter, have excellent leveling characteristics and produce a dry film that has excellent texture.

If desired, one may incorporate in the above composition certain other ingredients. Such other ingredients, as well as the above composition, will be described in more detail in the following material.

DESCRIPTION OF THE INVENTION

Film-Forming Polymers:

The polymers used as the film-forming components in the paints of this invention should have about 0.5–10 percent (by weight) of ethylenically unsaturated acid monomer units, preferably 1.5–10 percent and even more preferably 2–3 percent. These acid monomer units can be provided by such ethylenically unsaturated acids as acrylic acid, methacrylic acid, itaconic acid and its half esters with alkanols, maleic acid and its half esters with alkanols, fumaric acid, crotonic acid, vinyl sulfonic acid, styrene sulfonic acid, and the like. The polymer can have more than one type of acid monomer unit. Acrylic acid and methacrylic acid are preferred because of their availability and the quality of the finishes which are obtained when they are used.

The film-forming components are made by copolymerizing such an acid monomer with one or more other ethylenically unsaturated monomers containing about 2–20 carbon atoms. Illustrative of such other monomers are the esters of acrylic acid and methacrylic acid with alkanols of about 1–20 carbon atoms (such as ethyl acrylate, ethyl methacrylate, methyl methacrylate, 2-ethylhexyl acrylate, butyl acrylate, butyl methacrylate, lauryl acrylate and lauryl methacrylate); butadiene-1,3; acrylonitrile; ethylene; vinyl acetate; vinyl fluoride; vinyl chloride; vinylidene fluoride; vinylidene chloride; and aromatic monomers such as styrene, α-methyl styrene, vinyl toluene and the like. These monomers must of course by copolymerizable with the acid monomers.

As is well known in the art, these monomers can be copolymerized in such proportions and the resulting polymers can be physically blended in such proportions, as to give products with desirable balances of properties. For example, if a more viscous paint is desired, the acid monomer content can be increased. If more complete coalescence at lower temperatures is needed, more of a flexibilizing monomer such as ethyl acrylate or butadiene-1,3 can be used. By thus varying the monomers and their proportions to one another, one skilled in the art can prepare polymers having physical properties which will best suit them for use in the paints of this invention, keeping in mind the substrates to be covered by the paints, the conditions to which they are to be exposed, the sort of protection desired, and like factors.

If desired, the above-described polymers can be iminated according to the disclosure of McDowell and Hill U.S. Pat. No. 3,309,331 issued Mar. 14, 1967. That patent is hereby incorporated by reference for the sole purpose of describing such iminated polymers and how they can be prepared. Paints made with such iminated polymers have good wet adhesion.

If iminated polymers are to be used, they can be prepared according to the disclosure of the above McDowell and Hill patent by reacting enough of an aziridine compound (such as ethyleneimine, 1,2-propyleneimine, or the like) with the above described polymers of ethylenically unsaturated monomers to form thereon about 0.03–3 percent (by weight) of pendant radicals represented by the structures (1) 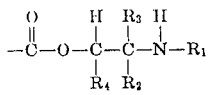

and (2) 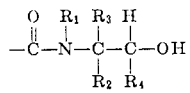

where $R_1$ can be hydrogen, benzyl or alkyl of 1–5 carbon atoms;

$R_2$ and $R_3$ can be hydrogen, benzyl or alkyl of 1–5 carbon atoms;

and $R_4$ can be hydrogen or alkyl of 1–5 carbon atoms.

These iminated polymers should have at least 1 percent (by weight) of free acid monomer units.

Preferred polymers include iminated and non-iminated terpolymers of an alkyl methacrylate of 4–15 (total) carbon atoms, an alkyl acrylate of 4–15 (total) carbon atoms and about 0.5–10 percent (by weight) of acrylic acid or methacrylic acid.

Preferred for an interior flat wall paint is a methyl methacrylate/2-ethylhexyl acrylate/methacrylic acid terpolymer whose monomer unit weight percentages are respectively 44/54/2.

Preferred for its resistance to cracking, its good adhesion and coalescence and its resistance to yellowing on aging is a methyl methacrylate/2-ethylhexyl acrylate/methacrylic acid terpolymer whose monomer unit weight percentages are 45/51/4 respectively, iminated to give about 0.03–1.5 percent (by weight) of the pendant radicals of formulas (1) and (2). Also preferred for the resistance to soiling it gives the paints is a methyl methacrylate/2-ethylhexyl acrylate/methacrylic acid terpolymer whose monomer unit weight percentages are 50/47/3 respectively, iminated to give about 0.03–2.5 percent (by weight) of the pendant radicals of formulas (1) and (2).

Preferred because of its low cost is a 1,3-butadiene/methyl methacrylate/methacrylic acid terpolymer whose monomer unit weight percentages are 32/65/3 respectively, iminated to give about 0.03–3 percent (by weight) of the pendant radicals of formulas (1) and (2). Also preferred because of its low cost is a 1,3-butadiene/methyl methacrylate/methacrylic acid terpolymer whose monomer unit weight percentages are 33/65/2 respectively.

These copolymers, iminated and non-iminated, should have number average molecular weights of at least about 50,000 or when incorporated with other ingredients to produce a paint, the resulting dry films will tend to not have desirable characteristics. Molecular weights within the range of 200,000 to 5,000,000 are preferred.

The paints of the invention are prepared using the copolymers in the form of aqueous dispersions. This means the copolymers must be "water insoluble". By "water insoluble" is meant that no more than about 2 percent of the polymer (by weight of the water) will dissolve in water at 25° C.

These aqueous dispersions contain the copolymers as discrete particles. The particles should have diameters in the range of 0.05–3 microns, preferably 0.1–0.5 micron.[1] ([1]Measured by electron microscopy. An electronmicrograph is made of a dispersion. From this actual physical measurements of the particle images are made, which are then adjusted for magnification to give particle diameter. The technique is further described in "Emulsion Polymerization" by Bovey, et al., Interscience Publishers, 1955, page 290.) Dispersions containing polymer particles smaller than about 0.1 micron are more difficult to stabilize; if the particles are larger than about 0.5 micron, the paints give less satisfactory coalescence and gloss. The dispersions will ordinarily contain about 30–70 percent (by weight) of polymer solids.

Aqueous dispersions of copolymers having the proper particle size can be prepared according to conventional emulsion polymerization techniques. According to these techniques, suitable monomers, in the desired proportions, are copolymerized in an aqueous medium containing a surfactant, a polymerization catalyst such as benzoyl peroxide or ammonium persulfate and a reducing agent such as sodium metabisulfite or potassium bisulfite. Polymerization is ordinarily carried out below about 90° C.

Hydrous Silicates

The hydrous silicates used in this invention are largely magnesium-calcium-aluminum silicate complexes or magnesium-aluminum-silicate complexes. They are available as purified clays of the montmorillonite, bentonite and attapulgite type from which gritty materials have been extracted.

Preferably the hydrous silicates are finely divided; even more preferably, they are finely enough divided so that a 1 percent by weight dispersion thereof in water exhibits colloidal character.

The preferred form in which these hydrous silicates are incorporated is as a preformed aqueous dispersion. Regardless of form and sequence of incorporation, it is preferred to mill the hydrous silicates in the presence of several times their own weight of water in the presence or the absence of other components of final paint. Milling can be accomplished with any of the wide variety of paint, grinding or dispersion mills, including roller, stone, and ball mills, Werner and Pfleiderer mixers and Cowles dissolvers.

Specific examples of hydrous silicates suitable for use in this invention include "Vee-Gum T" (available from R. T. Vanderbilt Company), "Ben-A-Gel" (available from National Lead Company), "Permagel" (available from Minerals and Chemicals Corporation of America and "Attagel 40" (available from Engelhard Minerals and Chemicals Corporation). The published analysis of some of these products are as follows on a dry weight basis:

|  | "Vee-Gum T" | "Permagel" | "Ben-A-Gel" |
|---|---|---|---|
| $SiO_2$ | 61.1% | 59.0% | 56.5% |
| MgO | 13.7 | 9.7 | 25.8 |
| CaO | 2.7 | 2.0 | 2.8 |
| $Al_2O_3$ | 9.3 | 11.8 | 0.2 |
| $Fe_2O_3$ | 0.9 | 4.4 | 0.2 |
| $TiO_2$ | 0.1 | 0.4 | 1.1 |
| $Na_2O, K_2O$ | | | |
| $P_2O_5$ etc. | 3.2 | 2.8 | 5.7 |
| Ignition Loss: | | | |
| Hydration Water | 7.2 | — | 7.7 |
| $CO_2$ | 1.8 | — | — |
| Total | 100.0% | 100.0% | 100.0% |

Preferred hydrous silicate is "Ben-A-Gel"; especially preferred is "Vee-Gum T".

Ordinarily there will be incorporated in the coating composition about 0.5 to about 2.0 percent by weight based on the entire weight of the composition of hydrous silicate. Preferably, there will be incorporated about 0.8 to about 1.1 percent by weight based on the entire weight of the composition. And, an especially preferred amount is about 0.9 percent by weight of hydrous silicate, based on the entire weight of the composition.

Non-Ionic Surfactants

Non-ionic surfactants suitable for use in this invention include the reaction product of an alkylene oxide or precursor thereof and a compound containing an active hydrogen.

Suitable alkylene oxides and their precursors include those having two through four carbon atoms such as alkylene oxide, butylene oxide, butylene dioxide, epichlorohydrin, isobutylene oxide and the like. Mixtures of such oxyalkylating reagents may also be used simultaneously or in sequence.

Suitable active hydrogen containing compounds include $C_1$ through $C_{12}$ alkyl phenols and saturated alcohols having from about eight to 22 carbon atoms. Mixtures of such active hydrogen containing compounds can also be used. As specific examples of these active hydrogen containing compounds there can be mentioned nonyl phenol octyl phenol dodecyl phenol diamyl phenol dibutyl phenol octyl alcohol decyl alcohol lauryl alcohol myristyl alcohol cetyl alcohol stearyl alcohol hydrogenated tallow alcohol R—OH wherein R is equal to $C_8$ through $C_{22}$, prepared by the "Oxo" process, i.e. addition of $H_2C = O$ and hydrogenation to the alcohol.

Non-ionic surfactants suitable for use in this invention can contain as few as about 9—10 moles of oxyalkyl units per mole of active hydrogen containing compound units. However, under most circumstances the non-ionic surfactants will contain about 30 through about 120 moles of oxyalkyl units per mole of active hydrogen containing compound units. Preferably there will be about 40 through about 100 moles of oxyalkyl units per mole of active hydrogen containing compound units and even more preferably about 40 through about 70 moles of oxyalkyl units per mole of active hydrogen containing compound units.

Preferred non-ionic surfactants include polyoxyalkylated nonyl phenol and polyoxyalkylated octyl phenol. Especially preferred are polyoxyethylated octyl phenol and polyoxyethylated nonyl phenol (i.e. the reaction product of octyl phenol or nonyl phenol with ethylene oxide).

Ordinarily there will be incorporated in the coating composition about 15 to about 200 percent by weight non-ionic surfactant. Preferably there will be used about 15 percent to about 100 percent non-ionic surfactant. And, especially preferred is about 40 to about 60 percent. (The foregoing percentages being by weight, based on the total weight of hydrous silicate in the coating composition.)

Non-Cellulose Thickeners

Non-cellulosic thickeners suitable for use in this invention include those prepared by admixing 1. 1–50 parts (by weight) of a copolymer of a.

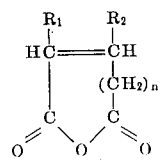

where $R_1$ and $R_2$ are
hydrogen, halogen, —CN, alkyl radicals of one through six carbon atoms, phenyl, benzyl or cycloaliphatic radicals of three through six carbon atoms; and $n$ is 0, 1, 2 or 3, or itaconic anhydride;

and b. an alkene of two through nine carbon atoms, vinyl acetate, vinyl chloride, methyl vinyl ether, ethyl vinyl ether, indene, cinnamic acid ethyl ester, acenaphthene, acrylonitrile, or an ester of acrylic- or methacrylic acid with an alkanol of 1–18 carbon atoms, the (a) to (b) ratio being 0.05—1/1—1.5, the copolymer having a weight average molecular weight of 20,000 to 1,500,000, with 2. 1 part (by weight) of a compound of the formula $$M\zeta[(CH_2)_n\zeta]_mD$$

where

M is alkyl of one through 18 carbon atoms or aryl of six through 20 carbon atoms;

$\zeta$ is —NH—, oxygen or sulfur;

D is hydrogen, alkyl of one through 18 carbon atoms or aryl of six through 20 carbon atoms;

$n$ is 1–5;

and $m$ is 1–100.

Preferred are materials which can be obtained from General Aniline and Film Corporation as "Thickener L" or "Thickener LN." These products are stated to be partial esters of 2 parts of a methyl vinyl ether/maleic anhydride 1/1 copolymer and 1 part of a polyoxyethylated lauryl alcohol having 16 moles of ethylene oxide units per mole of alcohol units. "Thickener L" is a potassium salt and "Thickener LN" is an ammonium salt.

These products can be prepared according to the methods set forth in U.S. Pat. No. 3,301,829 and U.S. Pat. No. 3,306,863.

Since the amount of non-cellulosic thickener in the coating composition may vary depending on whether a cellulosic thickener is present, the amount of both of these additives will be discussed under the heading "Cellulosic Thickeners".

Cellulosic Thickeners

Suitable cellulosic thickeners for use in this invention include hydroxyethyl cellulose and methylcellulose (the term methylcellulose being meant to include methylcellulose that has some of its methoxyl groups replaced with hydroxypropoxyl groups). Hydroxyethyl cellulose is commercially available from Union Carbide Corporation as "Cellosize." Methylcellulose is commercially available from Dow Chemical Company as "Methocel." Preferably, the hydroxyethyl cellulose or methylcellulose should be non-ionic.

The viscosity of the cellulosic thickener as measured in a 2 percent by weight solution in water should be from about 1,500 centipoises to about 50,000 centipoises. And, under most circumstances, it will be from about 2,000 centipoises to about 15,000 centipoises. Preferably, it will be in the range of about 3,500 centipoises to about 5,500 centipoises.

A coating composition having a desirable balance of dripless qualities as well as leveling qualities contains about 0.1 to about 1.5 percent by weight, based on the entire weight of the composition, of a non-cellulosic thickener of the class previously described. In such composition, it has been found that the best balance of levelling and anti-drip qualities are obtained when the non-ionic surfactant has about 70 or more oxyalkyl groups per molecule.

Despite the desirable properties of the above composition, upon sitting for extended periods of time, it may have a tendency to exhibit syneresis. Consequently, to remedy this possibility of liquid settling out of the paint, a coating composition can be made that contains, in addition to the ingredients described under the heading "SUMMARY OF THE INVENTION," a cellulosic thickener. Ordinarily the amount of cellulosic thickener will be about 0.09 to about 0.5 percent. Preferably it will be about 0.09 to about 0.272 percent. And, an especially preferred range is about 0.09 to about 0.18 percent. (All of the foregoing percentages being by weight, based on the total weight of the composition.)

If however a cellulosic thickener is used, under most circumstances, one can decrease the amount of non-cellulosic thickener so that it is present in an amount of about no more than 1 percent. Preferably, when both a cellulosic and non-cellulosic thickener are used, it (the non-cellulosic thickener) will be present in the amount of about 0.18 to about 0.36 percent, and most preferably in the amount of about 0.24 percent (the foregoing percentages being by weight based on the entire weight of the composition).

Pigment

Conventional pigments can be used in the paints of the invention, either alone or in combination. Illustrative are rutile titanium dioxide, anatase titanium dioxide, carbon black, lamp black, finely divided kaolin clays, chrome yellow, chrome green, black iron oxide, "Monastral" green pigment, "Monastral" blue pigment, "Dalamar" yellow pigment, lithopone, and the like. These pigments can be extended with conventional extenders such as diatomaceous silica, calcium carbonate, barium sulfate, talc, various clays, mica, and the like.

The degree of gloss of the paints of the invention is governed by the pigment volume concentration[1] ([1]Pigment volume concentration is defined as the percent of pigment (by volume) in a dried film of the paint.) of the paint and the particle size[2] ([2]Measured by electron microscopy.) of the extender used. Although the following figures and ranges tend to overlap somewhat, it should be understood that, in a general way, they define semi-gloss and gloss paints and that the actual values will depend on the pigments and film-forming polymers being used and the degree of gloss desired. The proper selection can easily be made by one skilled in this art.

Generally, the flat paints will have pigment volume concentrations of 30–70 percent and the particles of the extenders will have diameters ranging from 0.01–200 microns. The semi-gloss paints will have pigment volume concentrations of 10–35 percent and the particles of the extenders will have diameters ranging from 0.01–10 microns. The gloss paints will have pigment volume concentrations of 5–25 percent and the extender particles will have diameters ranging from 0.01–1 micron.

Other Adjuncts

Other conventional paint adjuncts can also be added to the paints of the invention. For example, glycols such as ethylene glycol and propylene glycol can be added to the paints, at concentrations of up to 30 percent (by weight), to increase their wet-edge time and to further improve their lapping characteristics. Defoamers, pigment dispersants and microbiocides can also be added, in the usual amounts.

pH of the Coating Composition

Ordinarily, the paints of this invention have pH values of about 8–10.5, preferably 9–9.8. The pH values are ordinarily, but not necessarily, brought to within these ranges by including in the paints about 0.0035–0.7 milliequivalents of a base per gram of paint.

Suitable bases include sodium hydroxide, potassium hydroxide, and volatile nitrogenous base having a vapor pressure greater than about $1 \times 10^{-4}$ millimeters of mercury at 25° C. such as ammonia, monoethanolamine, diethanolamine, propanolamine, morpholine, pyrrolidine, or piperidine. Ammonia is preferred for its volitility and low cost.

Method of Making a Coating Composition; Utility

A composition of this invention can be made by separately preparing an aqueous polymer dispersion and an aqueous dispersion of hydrous silicate and pigment. The pigment-hydrous silicate dispersion is then added to the polymer dispersion with stirring. To the resulting admixture is then added the thickeners and adjuncts. If necessary the composition is then preferably adjusted to the appropriate pH with the proper amount of a base.

The paints of this invention can be used to coat materials including wood, plaster, metal, etc.

The following examples illustrate the invention. All parts and percentages are by weight unless otherwise specified.

EXAMPLE 1

An aqueous polymer dispersion was made from the following materials:

| | | Parts |
|---|---|---|
| 1. | Demineralized water | 217.00 |
| 2. | "Duponol WAQ-E"[a] | 12.91 |
| 3. | Sodium metabisulfite | 0.38 |
| 4. | Demineralized water | 190.00 |
| 5. | Methyl methacrylate | 171.27 |
| 6. | 2ethylhexyl acrylate | 210.21 |
| 7. | Methacrylic acid | 7.79 |
| 8. | Ammonium persulfate | 0.64 |
| 9. | Demineralized water | 8.70 |
| 10. | Ammonium persulfate | 0.18 |
| 11. | Demineralized water | 3.40 |
| 12. | Demineralized water | 23.39 |
| 13. | Ammonia — 28% in water | 5.82 |
| 14. | Ethylene glycol | 4.91 |
| 15. | "Triton X–405"[b] | 12.23 |
| 16. | "Balab 748" defoamer (Balab, Inc.) | 2.00 |
| Total | | 871.63 |

[a] A sodium lauryl sulfate sold by E. I. du Pont de Nemours and Co.
[b] A compound having the structure

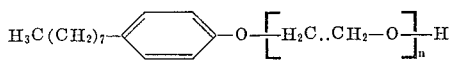

wherein n is about 45, available from Rohm and Haas Co.

Ingredient (1) was charged to a glass-lined reactor. The reactor was then filled with nitrogen and the remainder of the reaction was conducted under a nitrogen blanket.

Ingredients (2), (3) and (4) were placed in a separate vessel and mixed. Ingredients (5), (6) and (7) were then added to this vessel and the contents agitated to emulsify them. Ten percent (by volume) of this mixture (58 parts) was then charged to the reactor, with stirring, and the resulting mass heated to about 65° C.

Ingredients (8) and (9) were then placed in a separate stainless steel container and stirred. The resulting solution was then added to the reactor, with stirring. The temperature of the reaction mass was allowed to rise to about 75° C. and was held at that temperature for 5 minutes.

The remaining 90 percent (by volume) of the monomer mixture (521 parts of the admixture of ingredients (2), (3), (4), (5) (6) and (7) were then added uniformly to the reactor over a 50-minute period. During this addition period, the temperature of the reaction mass was maintained at about 80° C.

Ingredient (10) was then dissolved in ingredient (11) and the resulting solution was added to the reactor 5 minutes after the monomer addition was completed. Stirring was continued while the reaction mass was held at 80° C. for 30 minutes.

Ingredient (13) was dissolved in ingredient (12) and the solution thereof was then added to the reactor over a 10 minute period with stirring.

Ingredients (14), (15) and (16) were mixed in a separate stainless steel container, and this mixture was then added to the reactor, with stirring, when the temperature of the reaction mass had cooled to 40°–45° C. The mass was then cooled to room temperature.

The resulting dispersion was then filtered through a 100-mesh screen to give an aqueous dispersion of a methyl methacrylate/2-ethylhexyl acrylate/methacrylic acid 44/54/2 terpolymer (46.2 percent polymer solids) whose particles were about 0.12 micron in diameter. The polymer had a number average molecular weight greater than about one-half million, and had about 2.0 percent (by weight) of copolymerized methacrylic acid units.

EXAMPLE 2

A dispersion of montmorillonite clay and pigment was prepared as follows:

| | | Parts |
|---|---|---|
| aa. | Water at 140°F. | 126.5 |
| bb. | Montmorillonite clay "Vee-Gum T" (R. T. Vanderbilt Co.) | 9.5 |
| Total | | 136.0 |

Ingredient (bb) was sifted into the warm water with good agitation, and the resulting mixture mixed for 30 minutes. It was then allowed to cool to room temperature.

The following ingredients were then added to the mixture of (aa) and (bb):

| | | Parts |
|---|---|---|
| 1. | Methylcellulose-"Methocel 65 HG" (Dow Chemical Co.) | 1.07 |
| 2. | Water | 282.8 |
| 3. | "Triton X-100"[a] | 2.94 |
| 4. | "Tamol 731-A"–25% solution of sodium polycarboxylate in water (Rohm & Hass Co.) | 11.67 |

| 5. | Defoamer - "Polyglycol P-1200" (Dow Chemical Co.) | 1.86 |
| 6. | 28% Ammonia solution | 1.87 |
| 7. | "Metasol 57"[b] | |
| 8. | Calcium carbonate, Gilder's Whiting | 29.21 |
| 9. | Diatomaceous earth, "Celite 375" (John's-Manville Corp.) | 73.03 |
| 10. | Calcined clay, "Ice Cap K" (Burgess Pigments Co.) | 28.15 |
| 11. | Aluminum Silicate, "ASP 200" (Minerals & Chemicals Philipp Corp.) | 29.57 |
| 12. | Titanium dioxide, "TiPure R-931"[c] | 251.67 |
| 13. | Soya Lecithin | 10.95 |
| Total | | 725.00 |

[a] A compound having the structure

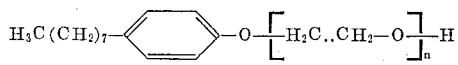

wherein $n$ is about 9–10, available from Rohm and Haas Co.

[b] phenyl mercury proprionote, sold by Merck, Inc.
[c] sold by E. I. du Pont de Nemours & Co.

Ingredient (1) was added to the mixture of (aa) and (bb) followed by mixing for 30 minutes.

To the resulting mixture were then added slowly with mixing, ingredients (2), (3), (4), (5) and (6). Ingredient (7) was then added with stirring for 5 minutes.

To the resulting mixture were then added slowly under high speed mixing ingredients (8), (9), (10), (11), (12) and (13).

The entire mixture was then mixed for 30 minutes at high speed.

EXAMPLE 3

A flat wall paint was prepared according to the following formula:

| | | Parts |
|---|---|---|
| 1. | Polymer Dispersion of Example 1 | 208 |
| 2. | Pigment-Montmorillonite clay dispersion of Example 2 | 861 |
| 3. | Ethylene glycol | 40 |
| 4. | Defoamer "Balab 748" (Balab, Inc.) | 2 |
| 5. | "Thickener L" (General Aniline and Film Corp.) | 26 |
| Total | | 1137 |

Ingredient (2) was added to (1) and mixed for 10 minutes. Ingredient (3) was then added while the mass was being mixed. This was mixed for 10 minutes, when (4) was added. Ingredient (5) was added slowly, and the mixture mixed for 30 minutes until thoroughly uniform.

The resulting paint had a pH of 9.2–9.4, had a Stormer viscosity of 95–100 Krebs Units, and had a gloss rating of 2.0 when viewed at an 85° angle.

When brushed or rolled, the paint exhibited excellent flow and leveling qualities as well as a minimum of dripping and splattering. It dried in 30–60 minutes depending on ambient conditions, and the resulting dry film had excellent texture.

If the paint was undisturbed, a gel structure developed which inhibited water separation or separation of the pigment from the mass of the paint. This gel structure assumed a lower consistency when the paint was sheared by mechanical means; when the paint was allowed to remain undisturbed, the gel structure reformed.

EXAMPLE 4

An aqueous polymer dispersion was made from the following materials:

| | | Parts |
|---|---|---|
| 1. | Demineralized water | 217.00 |
| 2. | "Duponol WAQ-E" | 12.91 |
| 3. | Sodium metabisulfite | 0.38 |
| 4. | Demineralized water | 190.00 |
| 5. | Methyl methacrylate | 170.51 |
| 6. | 2-ethylhexyl acrylate | 200.85 |
| 7. | Methacrylic acid | 7.58 |
| 8. | Ammonium persulfate | 0.64 |
| 9. | Demineralized water | 8.70 |
| 10. | Ammonium persulfate | 0.18 |
| 11. | Demineralized water | 3.40 |
| 12. | Propyleneimine | 2.50 |
| 13. | Demineralized Water | 27.90 |
| 14. | Ammonia — 28% in water | 5.82 |
| 15. | "Balab 748" defoamer (Balab, Inc.) | 2.00 |
| 16. | "Triton X-405"" | 16.30 |
| Total | | 872.76 |

These materials were processed as in Example 1 except that ingredient (12) was added to the reactor via a dip tube below the liquid level over a 10 minute period with stirring after which the resulting admixture was held, with stirring for 10 minutes. Ingredients (13), (14), and (15) were mixed in a separate stainless steel container and this mixture was then added to the reactor, with stirring, when the reaction mass temperature had cooled to 55°–60° C. The mass was held for 60 minutes at 55°–60° C. and then cooled to room temperature. Ingredient (16) was then added and mixed for 5 minutes.

The resulting dispersion was then filtered through a 100 mesh screen to give an aqueous dispersion of an iminated methyl methacrylate/2-ethylhexyl acrylate/methacrylic acid 45/53/2 terpolymer (45.8 percent polymer solids) whose particles were about 0.12 micron in diameter. The polymer had about 1.3–1.5 percent (by weight) of copolymerized methacrylic acid units, the carboxyls in the other 0.7–0.5 percent having been converted by the propyleneimine to pendant radicals of formulas (1) and (2).

EXAMPLE 5

A flat wall paint was made according to the formula of Example 3 with the exception that the polymer dispersion of Example 4 was used in place of the polymer dispersion of Example 1.

Equally desirable results were obtained.

EXAMPLE 6

An aqueous polymer dispersion was made from the following materials:

| | | Parts |
|---|---|---|
| 1. | Sodium metabisulfite | 0.08 |
| | Demineralized water | 2.84 |
| 2. | "Triton 770"[a] | 1.09 |
| | Demineralized water | 2.84 |
| 3. | Demineralized water | 26.90 |
| 4. | Butadiene, 1—3 | 10.79 |
| | Methyl Methacrylate | 21.25 |
| | Methacrylic acid | .65 |
| 5. | "Triton–770" | 1.09 |
| | Demineralized water | 8.58 |
| 6. | Ammonium Persulfate | .245 |
| | Demineralized water | 3.097 |
| 7. | Ammonium Persulfate | .082 |
| | Demineralized water | 1.36 |
| 8. | 28% Ammonia solution | 1.04 |
| 9. | Defoamer, "Colloids 581B" (Colloids, Inc.) | .042 |
| 10. | "Triton X-405" | 1.80 |

| | |
|---|---|
| Demineralized water | 1.17 |
| Total | 85.82 |

*a*-Sodium salt of an alkyl aryl polyester sulfate (Rohm & Haas Co.)

Ingredients (1), (2), (3) were added to a reactor which was then purged for 10 minutes with nitrogen and evacuated. Then, the vacuum was broken with nitrogen, the reactor again evacuated and then held under vacuum.

The contents of the reactor were heated to 67° C. and stirred. In a separate vessel, ingredients (4) and (5) were emulsified by agitation; 6 percent by weight of this emulsion (2.54 parts) was then added to the reactor over a 10 minute period with the reactor temperature at 66°–67° C.

Ingredient (6) was then added to the reactor in 1 minute or less, and 5 minutes thereafter the remaining portion of the emulsion of ingredient (4) and (5) was uniformly added to the reactor over a period of 170 minutes. The temperature of the reaction mass was allowed to rise to 71° C. and was kept within the range of 70°–72 C. throughout the remainder of the reaction.

Two and one-half hours after the addition of ingredient (6), ingredient (7) was added. The temperature of the reaction mass was allowed to rise to 75°—80° C. and was held there for 10 minutes.

Ingredient (8) was then added by means of a dip tube below the liquid level over a 10 minute period.

Then, the pH of the reaction mass was adjusted to 9.6 ± 0.2. The mass was allowed to cool and ingredient (9) was added.

The mass was cooled to 50° C. and ingredient (10) was added over a 10 minute period. The mass was mixed for 10 minutes more and cooled. It was then filtered through a 100 mesh screen to give an aqueous dispersion of butadiene, 1,3/methyl methacrylate/methacrylic acid 33/65/2 terpolymer (41.1 percent solids) whose particles were about 0.1 micron in diameter.

EXAMPLE 7

A flat wall paint was made according to the formula of example 3 with the exception that the polymer dispersion of example 6 was used in place of the polymer dispersion of example 1.

Equally desirable results were obtained.

EXAMPLE 8

A polymer dispersion was made according to the formula of example 1 with the exception that non-ionic surfactant "Igepal CO-977" (an ethoxylated nonyl phenol containing about 50–60 moles of ethylene oxide units per mole of phenol units, available from General Aniline and Film Corp.) was used instead of non-ionic surfactant "Triton X-405."

EXAMPLE 9

A polymer dispersion was made according to the formula of example 4 with the exception that non-ionic surfactant "Igepal CO-977" was used in place of non-ionic surfactant "Triton X-405".

EXAMPLE 10

A polymer dispersion was made according to the formula of example 6 with the exception that non-ionic surfactant "Igepal CO-997" (an ethoxylated nonyl phenol containing about 100 moles of ethylene oxide unites per mole of phenol units, available from General Aniline and Film Corp.) was used in place of the non-ionic surfactant "Triton X-405".

EXAMPLE 11

A pigment dispersion was made according to the following formula:

| | Parts |
|---|---|
| 1. Montmorillonite clay dispersion of example 2 | 150.0 |
| 2. Demineralized water | 240.0 |
| 3. "Triton X–100" | 2.9 |
| 4. "Tamol 731–A"(Rohm & Haas Co.) | 11.8 |
| 5. Defoamer — "Polyglycol P–1200" | 2.0 |
| 6. ∞% Ammonia solution | 2.0 |
| 7. "Metasol 57" | 0.2 |

The above ingredients were mixed together in the order shown on a low speed mixer, and then to this mixture was added on a high speed mixer the following:

| | | |
|---|---|---|
| 8. | Calcium carbonate, Gilder's Whiting | 29.2 |
| 9. | Diatomaceous earth, "Celite 375" (John's Manville Corp.) | 73.0 |
| 10. | Calcined clay, "Ice Cap K" (Burgess Pigments Co.) | 28.2 |
| 11. | Aluminum silicate, "ASP-200" (Phillips Co.) | 29.6 |
| 12. | Titanium dioxide "TiPure R–931" | 251.7 |
| 13. | Soya Lecithin | 11.0 |
| Total | | 831.6 |

The resulting mixtures were mixed for 30 minutes.

EXAMPLE 12

A flat wall paint was made according to the following formula:

| | Parts |
|---|---|
| 1. Polymer dispersion of example 8 | 231.0 |
| 2. Pigment dispersion of example 11 | 831.6 |
| 3. Ethylene glycol | 40.0 |
| 4. Defoamer — "Balab 748" | 2.0 |
| 5. "Thickener L" | 45.0 |
| Total | 1149.6 |

The resulting paint had a pH of 9.2—9.4, a Stormer viscosity of 95—105 Krebs Units and a gloss rating of 2.5 when viewed at an 85° angle.

When brushed or rolled, the paint exhibited excellent flow and leveling qualities as well as a minimum of dripping and splattering.

When allowed to remain undisturbed, the paint developed a gel structure which inhibited separation of the pigment and water. When the paint was subjected to mechanical shear, the gel assumed a lower consistency; thereafter, when it was allowed to remain undisturbed, the gel structure regenerated.

EXAMPLE 13

A paint was made according to the formula of example 12 with the exception that the polymer dispersion of example 9 was used in place of the polymer dispersion of example 8.

Equally desirable results were obtained.

EXAMPLE 14

A paint was made according to the formula of example 12 with the exception that 240 parts of the polymer dispersion of example 10 were used in place of the polymer dispersion of example 8.

Equally desirable results were obtained.

EXAMPLE 15

The foregoing examples can be repeated with the exception that "Ben-A-Gel" water-swellable hydrous silicate is used in place of the "Vee-Gum T" water swellable hydrous silicate.

The Invention claimed is:

1. A coating composition comprising:
   A. An aqueous dispersion of at least one particulate water insoluble copolymer of ethylenically unsaturated monomers of 2–20 carbon atoms, said copolymer containing about 0.5–10 percent (by weight) of ethylenically unsaturated acid monomer units and having a number average molecular weight of at least 50,000, the copolymer particles having diameters within the range of 0.05–3 microns;
   B. about 0.5 to about 2 percent by weight, based on the entire weight of the composition, of finely divided water insoluble hydrous silicate;
   C. about 15 to about 200 percent by weight, based on the weight of the hydrous silicate, of non-ionic surfactant selected from the group consisting of polyoxyalkylated $C_1$ through $C_{12}$ alkyl phenols and polyoxyalkylated $C_8$ through $C_{22}$ alcohols;
   D. about 0.1 to about 1.5 percent by weight, based on the entire weight of the composition, of a non-cellulosic thickener prepared by admixing
      1. 1–50 parts (by weight) of a copolymer of
         a

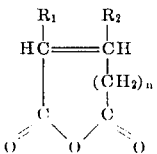

where $R_1$ and $R_2$ are hydrogen, halogen, —CN, alkyl radicals of one through six carbon atoms, phenyl, benzyl or cycloaliphatic radicals of three through six carbon atoms; and
$n$ is 0, 1, 2 or 3,
or
itaconic anhydride;
and
(b) an alkene of 2 through 9 carbon atoms, vinyl acetate, vinyl chloride, methyl vinyl ether, ethyl vinyl ether, indene, cinnamic acid, ethyl ester, acenaphthene, acrylonitrile, or an ester of acrylic or methacrylic acid with an alkanol of 1—18 carbon atoms;
the (a) to (b) ratio being 0.05—1/1—1.5, the copolymer having a weight average molecular weight of 20,000 to 1,500,000,
with 2. 1 part (by weight) of a compound of the formula $MZ[(CH_2)_nZ]_mH$
where
M is alkyl of one through 18 carbon atoms or aryl of six through 20 carbon atoms; Z is oxygen;
$n$ is 1—3 and
$m$ is 1—100,
said composition having a pH of about 8–10.5.

2. The coating composition of claim 1 wherein said copolymer described in is a terpolymer of an alkyl methacrylate of 414 15 (total) carbon atoms, an alkyl acrylate of 4—15 (total) carbon atoms and about 0.5–10 percent (by weight) of acrylic acid or methacrylic acid.

3. The coating composition of claim 2 wherein:
   said non-ionic surfactant described in (C) is selected from the group consisting of polyoxyalkylated nonyl phenol and polyoxyalkylated octyl phenol, and
   said non-cellulosic thickener described in (D) is selected from the group consisting of potassium salts and ammonium salts of partial esters of methyl vinyl ether/maleic anhydride copolymer and polyoxyethylated lauryl alcohol.

4. The coating composition of claim 3 wherein said hydrous silicate described in (B) is selected from the group consisting of purified clays of the montmorillonite, bentonite and attapulgite type.

5. The coating composition of claim 4 wherein said copolymer described in (A) is a methyl methacrylate/2-ethylhexyl acrylate/methacrylic acid terpolymer whose monomer unit weight percentages are respectively 44/54/2.

6. The coating composition of claim 5 which contains at least one pigment.

7. The coating composition of claim 1 wherein said copolymer described in has been iminated to give radicals represented by the structures

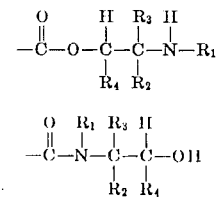

where $R_1$ can be hydrogen, benzyl or alkyl 1—5 carbon atoms,
$R_2$ and $R_3$ can be hydrogen, benzyl, or alkyl of 1—5 carbon atoms and
$R_4$ can be hydrogen or alkyl of 1—5 carbon atoms, said copolymer having at least 1 percent (by weight) of free acid monomer units.

8. The coating composition of claim 1 which contains about 0.09 percent to about 0.5 percent by weight, based on the entire weight of the composition, of at least one cellulosic thickener selected from the group consisting of hydroxyethyl cellulose and methylcellulose, and wherein the non-cellulosic thickener described in is present in an about of about 0.1 to about 1.0 percent by weight based on the entire weight of the composition.

9. The coating composition of claim 8 wherein said copolymer described in is a terpolymer of an alkyl methacrylate of 4–15 (total) carbon atoms, an alkyl acrylate of 4–15 (total) carbon atoms and about 0.5–10 percent (by weight) of acrylic acid or methacrylic acid.

10. The coating composition of claim 9 wherein:
    said non-ionic surfactant described in (C) is selected from the group consisting of polyoxyalkylated nonyl phenol and polyoxyalkylated octyl phenol, and
    said non-cellulosic thickener described in (D) is selected from the group consisting of potassium salts and ammonium slats of partial esters of methyl vinyl ether/maleic anhydride copolymer and polyoxyethylated lauryl alcohol.

11. The coating composition of claim 10 wherein said hydrous silicate described in (B) is selected from the group consisting of purified clays of the montmorillonite, bentonite and attapulgite type.

12. The coating composition of claim 11 wherein said copolymer described in is a methyl methacrylate/2-ethylhexyl acrylate/methacrylic acid terpolymer whose monomer unit weight percentages are respectively 44/54/2.

13. The coating composition of claim 12 wherein said non-ionic surfactant described in is selected from the group consisting of polyoxyethylated octyl phenol having about 30 to about 120 moles of ethylene oxide units per mole of phenol units and polyoxyethylated nonyl phenol having about 30 to about 120 moles of ethylene oxide units per mole of phenol units.

14. The coating composition of claim 13 which contains at least one pigment.

15. The coating composition of claim 13 wherein said copolymer described in has been iminated to give radicals represented by the structures

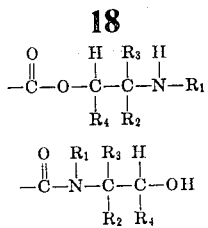

where $R_1$ can be hydrogen, benzyl or alkyl of 1—5 carbon atoms, $R_2$ and $R_3$ can be hydrogen, benzyl, or alkyl of 1—5 carbon atoms and $R_4$ can be hydrogen or alkyl of 1—5 carbon atoms, said copolymer having at least 1 percent (by weight) of free acid monomer units.

16. The coating composition of claim 15 which contains at least one pigment.

17. The coating composition of claim 13 wherein said copolymer described in is butadiene, 1—3/methylmethacrylate/methacrylic acid terpolymer whose monomer unit weight percentages are respectively 33/65/2.

18. The coating composition of claim 17 which contains at least one pigment.

* * * * *

UNITED STATES PATENT OFFICE
CERTIFICATE OF CORRECTION

Patent No. 3,687,885          Dated

Inventor(s) Murray S. Abriss and Maurice J. McDowell

It is certified that error appears in the above-identified patent and that said Letters Patent are hereby corrected as shown below:

Claim 2, column 16, line 2, "[A]" should be inserted before the word "is".

Claim 2, column 16, line 3, delete "414 15" and insert -- 4-15 --.

Claim 7, column 16, line 29, "[A]" should be inserted before the word "has".

Claim 7, column 16, line 40, "of" should be inserted before the word "1-5".

Claim 8, column 16, line 49, "[E]" should be inserted before the word "about".

Claim 8, column 16, line 54, "[D]" should be inserted before the word "is".

Claim 8, column 16, line 54, delete "about" and insert -- amount --.

Claim 9, column 16, line 58, "[A]" should be inserted before the word "is".

Claim 12, column 17, line 9, "[A]" should be inserted before the word "is".

Claim 13, column 17, line 14, "[C]" should be inserted before the word "is".

Claim 15, column 17, line 23, "[A]" should be inserted before the word "has".

Claim 17, column 18, line 23, "[A]" should be inserted before the word "is".

Signed and sealed this 24th day of April 1973.

(SEAL)
Attest

EDWARD M. FLETCHER, JR.
Attesting Officer

ROBERT GOTTSCHALK
Commissioner of Patents